US008154489B2

(12) United States Patent
Kita

(10) Patent No.: US 8,154,489 B2
(45) Date of Patent: Apr. 10, 2012

(54) LIQUID CRYSTAL MODULE

(75) Inventor: Tatsuya Kita, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 996 days.

(21) Appl. No.: 12/152,933

(22) Filed: May 19, 2008

(65) Prior Publication Data

US 2008/0291142 A1 Nov. 27, 2008

(30) Foreign Application Priority Data

May 23, 2007 (JP) ................................ 2007-136544

(51) Int. Cl.
*G09G 3/36* (2006.01)
*G09G 5/00* (2006.01)
*G06F 3/038* (2006.01)

(52) U.S. Cl. ......................................... 345/87; 345/204

(58) Field of Classification Search ............ 345/81–104, 345/204–215, 690–699; 324/770; 348/175–194; 349/192, 80, 106–109
See application file for complete search history.

(56) References Cited

U.S. PATENT DOCUMENTS

| | | | | |
|---|---|---|---|---|
| 5,812,149 | A | 9/1998 | Kawasaki et al. | |
| 6,243,066 | B1 | 6/2001 | Murakami et al. | |
| 6,862,008 | B2 * | 3/2005 | Yamazaki et al. | 345/62 |
| 7,595,776 | B2 * | 9/2009 | Hashimoto et al. | 345/76 |
| 2002/0000964 | A1 | 1/2002 | Sumiya | |
| 2002/0000970 | A1 | 1/2002 | Akimoto et al. | |
| 2002/0033900 | A1 | 3/2002 | Honma et al. | |
| 2002/0041245 | A1 | 4/2002 | Dacus et al. | |
| 2003/0006978 | A1 * | 1/2003 | Fujiyoshi | 345/204 |
| 2004/0046725 | A1 * | 3/2004 | Lee | 345/88 |
| 2006/0028493 | A1 * | 2/2006 | Shimoda et al. | 345/690 |
| 2006/0146128 | A1 * | 7/2006 | Ma et al. | 348/89 |
| 2006/0202938 | A1 | 9/2006 | Chen et al. | |
| 2006/0227278 | A1 * | 10/2006 | Chiang | 349/149 |
| 2007/0242011 | A1 * | 10/2007 | Kita | 345/87 |

FOREIGN PATENT DOCUMENTS

| | | | |
|---|---|---|---|
| EP | 0546780 | A | 6/1993 |
| EP | 1184836 | A | 3/2002 |
| EP | 1624441 | A | 2/2006 |
| JP | H04-060583 | | 2/1992 |
| JP | 2006-047603 | | 2/2006 |

OTHER PUBLICATIONS

The extended European search report, dated Aug. 6, 2009.
David D. Lee, et al: "A VLSI Controller for Active-Matrix LCDs" IEEE International Solid-State Circuits Conference, Feb. 1, 1994.
David D. Lee, et al: "A Universal Controller Architecture for Active-Matrix LCDs" SID International Symposium Digest of Papers, May 17, 1992.

* cited by examiner

*Primary Examiner* — Alexander Eisen
*Assistant Examiner* — Patrick F Marinelli
(74) *Attorney, Agent, or Firm* — Yokoi & Co., U.S.A., Inc.; Toshiyuki Yokoi

(57) ABSTRACT

A source circuit for generating, based on image data composed of RGB signals, drive voltages for a row of pixels arranged in a horizontal direction which is a main scanning direction on a liquid crystal panel 12*a* and applying the drive voltages to signal lines. The source circuit can interchange the drive voltages applied to the signal lines in accordance with an arrangement of a color filter by changing of setting of voltage to be supplied to the source circuit, and is electrically connected and integrally fixed to a glass substrate 31, and the setting of voltage to be supplied to the source circuit 20 is changed by changing wiring formed on the glass substrate 31.

4 Claims, 6 Drawing Sheets

LIQUID CRYSTAL MODULE

CROSS-REFERENCES TO RELATED APPLICATIONS

The present application is related to the Japanese Patent Application No. 2007-136544, filed May 23, 2007, the entire disclosure of which is expressly incorporated by reference herein.

BACKGROUND OF THE INVENTION

1. Field of the Invention

The present invention relates to a liquid crystal module, and in particular, relates to a liquid crystal module with a color filter in which RGB colors are arranged in a delta arrangement.

2. Description of Related Art

There is known a liquid crystal panel in which a plurality of signal lines which are arranged in a horizontal direction and each extend in a vertical direction and a plurality of scanning lines which are arranged in the vertical direction and each extend in the horizontal direction are disposed on a glass substrate and pixels in which liquid crystal material is packed at the intersection of each signal line and scanning line are arranged in a matrix form. In such a liquid crystal panel, a switching element such as a thin-film transistor and a pixel electrode are provided corresponding to each pixel. The liquid crystal panel is provided with a panel drive circuit which sequentially turns on and off switching elements for each scanning line to selectively supply signal voltages to pixel electrodes for application of the signal voltages to the liquid crystal. The liquid crystal panel and the panel drive circuit constitute a liquid crystal module in which the panel drive circuit changes the transmittance of the pixels having a RGB color filter in accordance with voltage levels and the liquid crystal panel displays a multiple-tone image based on image data composed of RGB signals.

Japanese Patent Application Laid-Open No. 2006-47603 discloses an image display apparatus that shares a circuit for processing image data for display by allowing a selector to sequentially selectively output color data based on a pixel arrangement set value even in the case of different color filter arrangements such as a delta arrangement and a stripe arrangement.

Japanese Patent Application Laid-Open No. 4-60583 discloses a drive circuit of a liquid crystal display apparatus that enables simple white-balance adjustment by outputting from a color selection circuit an output voltage divided in accordance with the color filter arrangement of a liquid crystal cell.

In RGB color filter arrangements, besides the above-mentioned different arrangements such as delta and stripe arrangements, there may be different RGB arrangements by liquid crystal cells in the same delta arrangement. FIG. 6 is an illustration showing six different RGB arrangements in the delta arrangement. In FIG. 6, (A) shows arrangements in which the pixels of the odd lines are shifted to the right by ½ pixel pitch, and (B) shows arrangements in which the pixels of the odd lines are shifted to the left by ½ pixel pitch. Further, (1) shows arrangements in which the pixels of the odd lines are arranged in order of RGB, (2) shows arrangements in which the pixels of the odd lines are arranged in order of GBR, and (3) shows arrangements in which the pixels of the odd lines are arranged in order of BRG. The even lines are arranged based on the arrangements of the odd lines, as shown in FIG. 6.

When a color filter having a different arrangement is used, image data composed of RGB signals to be inputted to the panel drive circuit needs to be changed in accordance with the color filter. On the other hand, the same image data can be inputted by changing the color filter. However, since it takes time to change a color filter and such a color filter having a different arrangement may be used in consideration of a reduction in the cost of a liquid crystal panel, it is not desirable to change the color filter.

As described, there are different arrangements of the color filter by liquid crystal cells even in the same delta arrangement. However, there has not been proposed a technique which enables a different arrangement of a color filter to be used as it is without changing image data composed of RGB signals to be inputted to the panel drive circuit.

BRIEF SUMMARY OF THE INVENTION

The present invention discloses a liquid crystal module that enables common use of an input signal even if a different arrangement of a color filter in the delta arrangement is used in a liquid crystal panel.

One aspect of the present invention provides a liquid crystal module that displays an image based on image data composed of RGB signals, the liquid crystal module comprising: a liquid crystal panel, having a color filter in which RGB colors are arranged in a delta arrangement, a plurality of signal lines that are arranged in a horizontal direction and extend in a vertical direction and a plurality of scanning lines that are arranged in the vertical direction and extend in the horizontal direction, and the signal linens and the scanning lines are disposed on a glass substrate and pixels at the intersection of each signal line and scanning line are arranged in a matrix form; a source circuit for generating, based on the image data, drive voltages for a row of pixels arranged in the horizontal direction, which is a main scanning direction on the liquid crystal panel, and applying the drive voltages to the signal lines; and a gate circuit for sequentially enabling the scanning lines, subjecting the scanning lines to the drive voltages in the vertical direction that is a sub-scanning direction on the liquid crystal panel, the source circuit can interchange the drive voltages applied to the signal lines in accordance with an arrangement of the color filter by changing of setting of voltage to be supplied to the source circuit, and is electrically connected and integrally fixed to the glass substrate, and the setting of voltage to be supplied to the source circuit is changed by changing wiring formed on the glass substrate.

In the liquid crystal module of this structure, since the source circuit can interchange the drive voltages applied to the signal lines in accordance with an arrangement of the color filter by changing wiring formed on the glass substrate to which the source circuit is electrically connected and integrally fixed and thereby changing the setting of voltage to be supplied to the source circuit, a different arrangement of the color filter can be used as it is without changing image data composed of RGB signals to be inputted to the source circuit. Further, when wiring which varies according to the source circuit and therefore originally requires design suitable for the source circuit is made on the glass substrate, the wiring for the supply voltage setting suitable for the color filter can be made simultaneously. According to the invention, since a different arrangement of the color filter can be used as it is without changing image data composed of RGB signals to be inputted to the source circuit, an input signal can be used in common even if a different arrangement of the color filter in the delta arrangement is used in the liquid crystal panel.

Accordingly, for example a circuit for supplying the input signal can be used in common, which is advantageous to cost reduction including time reduction. Further, when usual wiring suitable for the source circuit is made on the glass substrate, the wiring suitable for the color filter can be made simultaneously, which is further advantageous to cost reduction including time reduction.

According to another aspect of the invention, the source circuit is constructed on a substrate having wiring terminals, the wiring terminals include at least, two signal terminals for outputting mutually different voltages of a high and a low and two set terminals for setting an interchange of the drive voltages, and the setting of voltage to be supplied to the source circuit is changed by changing a combination of connections of the signal terminals to the set terminals by the wiring formed on the glass substrate. In the liquid crystal module of this structure, the voltage to be supplied to the source circuit can be changed by changing a combination of connections of the two signal terminals for outputting mutually different voltages of a high and a low to the two set terminals for setting an interchange of the drive voltages by the wiring formed on the glass substrate. So, according to the invention, a different arrangement of the color filter can be easily used as it is without changing image data composed of RGB signals to be inputted to the source circuit.

According to another aspect of the invention, the wiring terminals of the substrate on which the source circuit is constructed are bonded on the glass substrate on which the wiring is formed. In the liquid crystal module of this structure, the substrate on which the source circuit is constructed is electrically connected and integrally fixed to the glass substrate by bonding the wiring terminals on the glass substrate on which the wiring is formed. According to the invention, since the substrate on which the source circuit is constructed is electrically connected and integrally fixed to the glass substrate by bonding the wiring terminals on the glass substrate, the source circuit can easily interchange the drive voltages applied to the signal lines in accordance with an arrangement of the color filter.

According to another aspect of the invention, the wiring terminals include at least three set terminals, and it is possible to deal with six patterns of RGB arrangement of the color filter in the delta arrangement. In the liquid crystal module of this structure, having at least three set terminals and the two signal terminals for outputting mutually different voltages of a high and a low enables eight wiring combinations, thus making it possible to deal with six RGB arrangements of the color filter in the delta arrangement. According to the invention, since it is possible to deal with six RGB arrangements of the color filter in the delta arrangement, an input signal can be used in common even if any of the different arrangements of the color filter in the delta arrangement is used in the liquid crystal panel.

According to another aspect of the invention, the source circuit is a driver IC having the wiring terminals, the two signal terminals are a terminal for outputting a DC voltage of 3.3 volts and a grounded terminal, and the driver IC is integrally fixed on the glass substrate by bonding the wiring terminals on the glass substrate. In the liquid crystal module of this structure, the source circuit composed of the driver IC is integrally fixed on the glass substrate by bonding the wiring terminals on the glass substrate, so that the two signal terminals of a terminal for outputting a DC voltage of 3.3 volts and a grounded terminal are connected to the two set terminals for setting an interchange of the drive voltages through the wiring formed on the glass substrate. According to the invention, the driver IC is bonded and integrally fixed on the glass substrate and thereby the two signal terminals are connected to the two set terminals through the wiring formed on the glass substrate. Accordingly, only by making the wiring for the setting of voltage to be supplied to source circuit suitable for the color filter simultaneously when usual wiring suitable for the source circuit is made on the glass substrate, an input signal can be used in common even if a different arrangement of the color filter in the delta arrangement scheme is used in the liquid crystal panel.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

In accordance with the following items, an embodiment of the present invention will be described with reference to the accompanying drawings.

Figure 1:
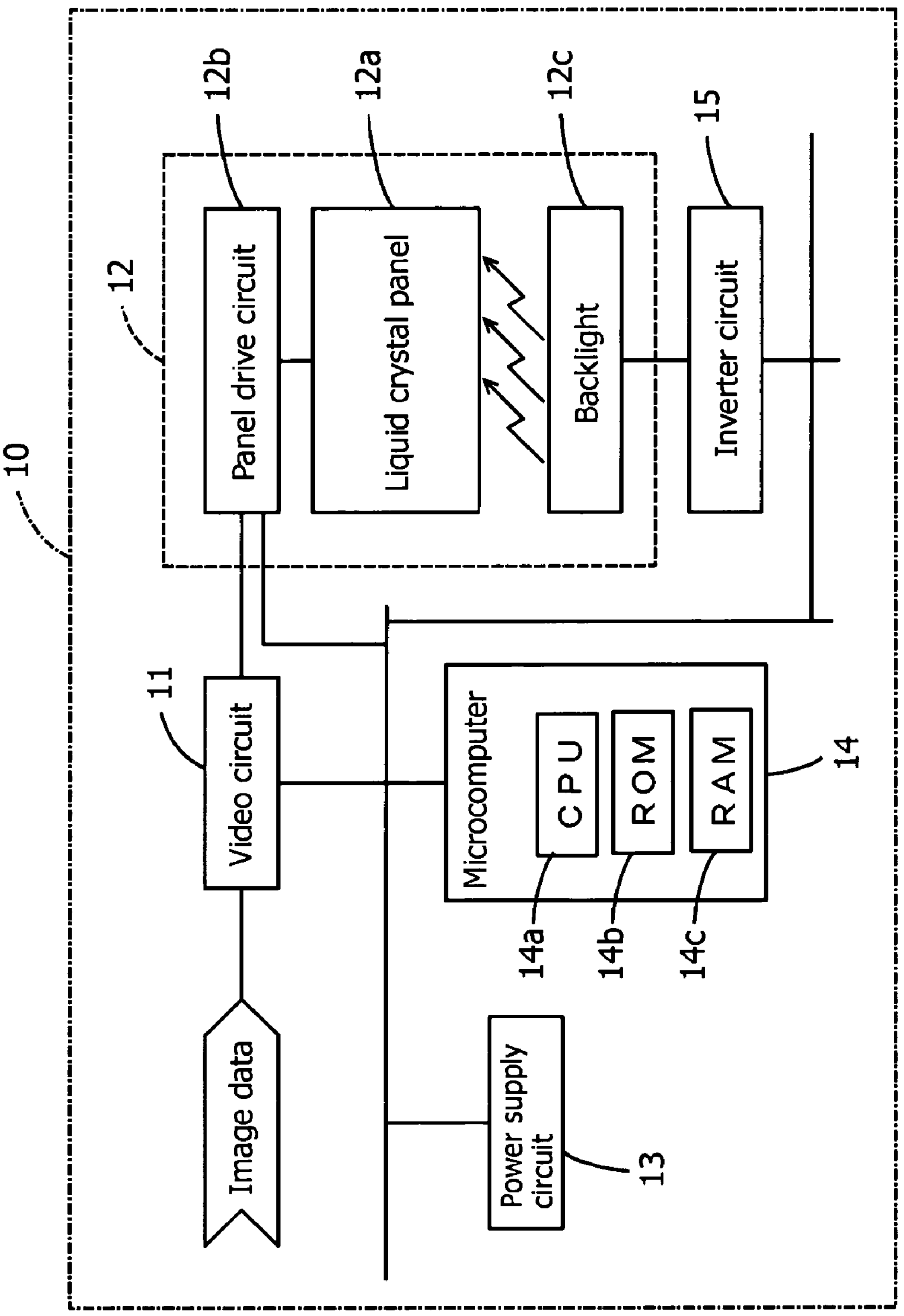
FIG. 1 is an example of block diagram of a display apparatus having a liquid crystal module.

1. Schematic configuration of a display apparatus having a liquid crystal module
2. Configuration of the liquid crystal module
3. Dealing with a color filter having a different RGB arrangement in the delta arrangement scheme
4. Conclusion 1. Schematic Configuration of a Display Apparatus Having a Liquid Crystal Module The schematic configuration of a display apparatus 10 having a liquid crystal module to which the invention is applied will be described with reference to FIG. 1. FIG. 1 is a block diagram of the display apparatus 10. In FIG. 1, the display apparatus 10 includes a video circuit 11, a liquid crystal module 12, a power supply circuit 13, a microcomputer 14, and an inverter circuit 15.

The power supply circuit 13 receives power supply voltage (AC) from an external commercial power supply or the like, and supplies the supplied power to the microcomputer 14, the inverter circuit 15, and other circuits. The power supply circuit 13 converts the power supply voltage from AC to DC for the circuits as necessary.

The microcomputer 14 is electrically connected to the circuits constituting the display apparatus 10, and a CPU 14*a* included in the microcomputer 14 controls the entire display apparatus 10 in accordance with programs written in a ROM 14*b* and a RAM 14*c* also included in the microcomputer 14.

The video circuit 11 performs scaling of digital image data composed of input RGB (Red, Green, Blue) signals in accordance with the number of pixels arranged in a matrix form (an aspect ratio of m:n) on a liquid crystal panel 12*a*, and generates for-one-screen image data to be displayed on the liquid crystal panel 12*a*. The video circuit 11 further performs processing such as brightness, contrast, and saturation corrections on this image data, and outputs the processed image data to the liquid crystal module 12. The digital image data composed of RGB signals is, for example, one that is generated by matrix conversion based on a brightness signal and color-difference signals extracted from a video signal for representing an arbitrary image or one that is generated by the microcomputer etc. Further, the video signal is, for example, one that is extracted by a known tuner from a television broadcast signal received by a known antenna or one that is outputted from a video reproducer.

The liquid crystal module 12 is composed of the liquid crystal panel 12*a*, a panel drive circuit 12*b*, and a backlight 12*c*. The liquid crystal panel 12*a* is, for example, an active matrix panel, and is composed of pixels 26 (see FIG. 2) having a color filter 30 (see FIG. 3) in which RGB colors are arranged in a matrix form in the delta arrangement scheme. The panel drive circuit 12*b*, controlled based on image data outputted from the video circuit 11, drives the liquid crystal panel 12*a* to display an image corresponding to the image data on the liquid crystal panel 12*a*. The backlight 12*c* is a light source for illuminating the liquid crystal panel 12*a* from the back side and includes a plurality of cold-cathode tubes.

The inverter circuit 15 converts DC voltage supplied from the power supply circuit 13 into AC voltage, and supplies the AC voltage as a drive signal to the backlight 12*c* to allow the backlight 12*c* to illuminate.

2. Configuration of the Liquid Crystal Module

Figure 2:
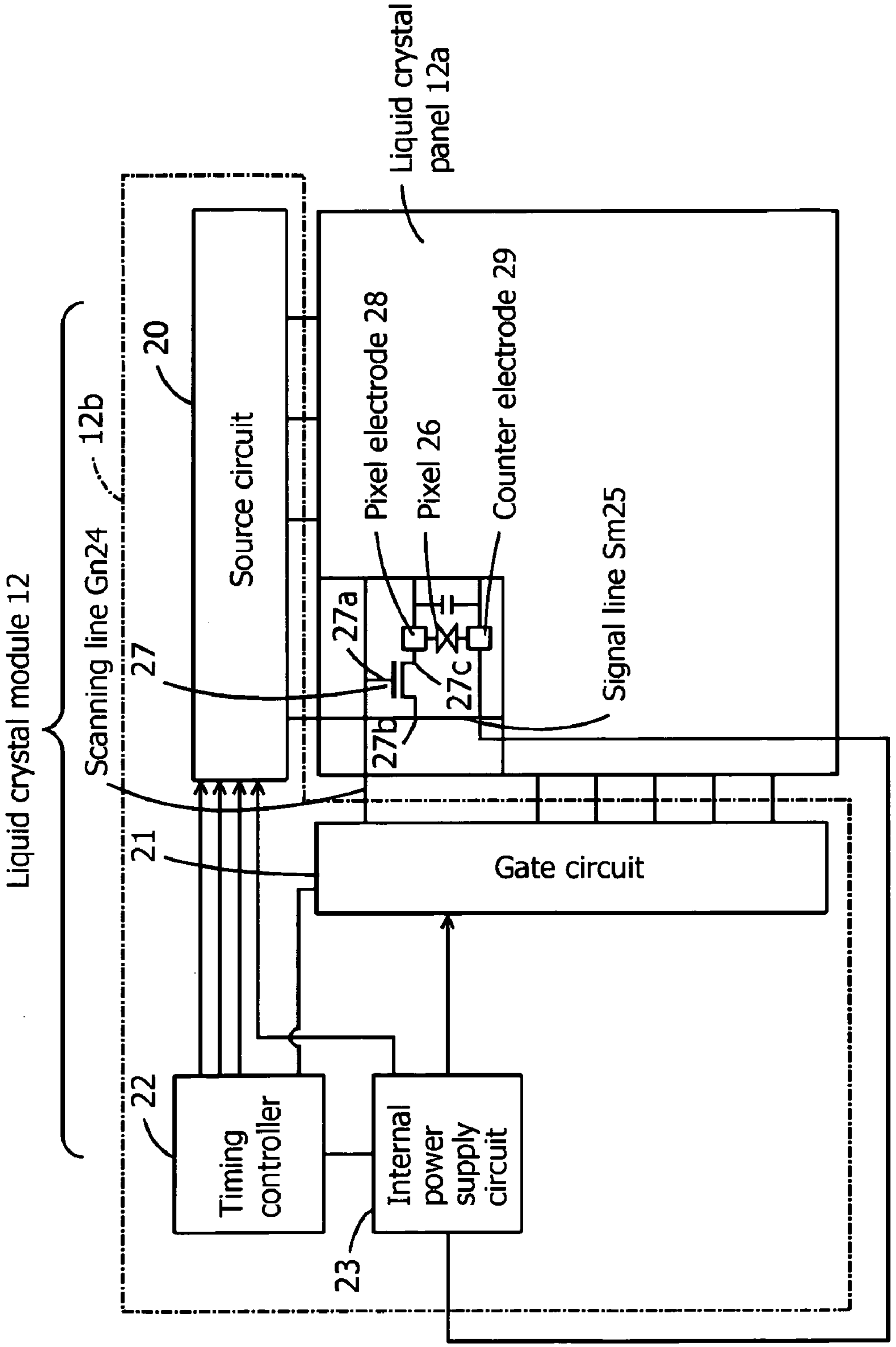
FIG. 2 is an example of block diagram of the liquid crystal module.

The configuration of the liquid crystal module 12 will be described in detail. FIG. 2 is a block diagram of the liquid crystal module 12. In FIG. 2, the panel drive circuit 12*b* is composed of a source circuit 20, a gate circuit 21, a timing controller 22, and an internal power supply circuit 23.

A glass substrate 31 (see FIG. 3) is disposed on the back of the liquid crystal panel 12*a* composed of a plurality of pixels 26 in which liquid crystal material is packed. On the glass substrate 31, a plurality of scanning lines G1 to GN (N is a natural number not less than 2) which are arranged in a vertical direction and each extend in a horizontal direction and a plurality of signal lines S1 to SM (M is a natural number not less than 2) which are arranged in the horizontal direction and each extend in the vertical direction are disposed. Further, pixels 26 in which liquid crystal material is packed at the intersection of each scanning line Gn24 ($1 \leqq n \leqq N$, n is a natural number) and signal line Sm25 ($1 \leqq m \leqq M$, m is a natural number) are arranged in a matrix form.

A pixel 26 is provided with a field-effect transistor 27. A gate electrode 27*a* of the field-effect transistor 27 is connected to a scanning line Gn24, a source electrode 27*b* of the field-effect transistor 27 is connected to a signal line Sm25, and a drain electrode 27*c* of the field-effect transistor 27 is connected to a pixel electrode 28 formed with a capacitor. Further, the pixel electrode 28 is connected to the pixel 26 on the liquid crystal panel 12*a*. In the above structure, the field-effect transistor 27 acts as a switch for applying a drive voltage applied to the signal line Sm25 to the pixel electrode 28.

The pixel 26 on the liquid crystal panel 12*a* to which the pixel electrode 28 is connected is connected to a counter electrode 29, and the transmittance of liquid crystal material packed in the pixel 26 can be changed in accordance with an applied voltage between the pixel electrode 28 and the counter electrode 29 opposed thereto.

The source circuit 20 generates a drive voltage based on image data inputted from the timing controller 22 and applies the drive voltage to the signal line Sm25. The source circuit 20 includes a plurality of flip-flops, to which a clock signal and a horizontal synchronization signal generated by the timing controller 22 are inputted. When the source circuit 20 stores an enable input/output signal for outputting image data in synchronization with the clock signal outputted from the timing controller 22, the source circuit 20 sequentially inputs the enable input/output signal to adjacent flip-flops in synchronization with the clock signal.

Further, the source circuit 20 receives image data in units of 18 bits (6 bits (gray-scale data)×3 (RGB colors)) from the timing controller 22, and the flip-flops latch the image data in synchronization with the sequentially inputted enable input/output signal. Further, the source circuit 20 latches the latched one-horizontal-scanning image data in synchronization with the horizontal synchronization signal supplied from the timing controller 22.

Further, the source circuit 20 generates an analog drive voltage for each signal line Sm25 based on the latched image data. The source circuit 20 converts the image data from digital to analog form, using a gray-scale voltage generated by the internal power supply circuit 23. Then, the source circuit 20 applies the generated drive voltage to the signal line Sm25.

The gate circuit 21 generates a drive voltage based on a signal from the timing controller 22 and applies the drive voltage to the scanning line Gn24. In the gate circuit 21, a clock signal and a vertical synchronization signal from the timing controller 22 are sequentially inputted to flip-flops provided corresponding to scanning lines Gn24. Two kinds of scanning line drive signals are inputted from the internal power supply circuit 23 to the gate circuit 21, and the scanning line drive signals are stored in the flip-flops in synchronization with the clock signal. Further, the gate circuit 21 shifts the scanning line drive signals to adjacent flip-flops in synchronization with the vertical synchronization signal.

Further, the gate circuit 21 shifts the scanning line drive signals to a voltage level corresponding to the liquid crystal material of the liquid crystal panel 12*a*. The gate circuit 21 performs CMOS drive based on the two kinds of shifted scanning line drive signals. At this time, upon input of a first scanning line drive signal out of the two kinds of scanning line drive signals inputted from the internal power supply circuit 23, the gate circuit 21 outputs the scanning line drive signal to the scanning line Gn24. Further, upon input of a second scanning line drive signal, the gate circuit 21 stops the output of the scanning line drive signal.

The timing controller 22 controls the source circuit 20, the gate circuit 21, and the internal power supply circuit 23 in accordance with image data composed of RGB signals supplied from the video circuit 11 and a control signal for controlling the source circuit 20 and the gate circuit 21 supplied from the microcomputer 14. More specifically, the timing controller 22, for example, sets an operation mode and supplies a vertical synchronization signal and a horizontal synchronization signal generated therein to the source circuit 20 and the gate circuit 21.

Upon receipt of image data, the timing controller 22 stores the image data in a RAM. Similarly, upon receipt of a control signal, the timing controller 22 stores the control signal in the RAM. The timing controller 22 generates a clock signal in accordance with data set in a ROM. Further, with display timing generated from the clock signal, the timing controller 22 generates, from the image data stored in the RAM, image data in a predetermined form, and supplies it to the source circuit 20.

The internal power supply circuit 23 generates a voltage level necessary to drive the liquid crystal of the liquid crystal panel 12*a*, a gray-scale generating voltage for generating a gray-scale voltage used for a drive voltage in the source circuit 20, and two kinds of scanning line drive signals used for on-off control of the scanning line Gn24 in the gate circuit 21, based on a power supply voltage supplied from the power supply circuit 13.

In the liquid crystal module 12 having the above structure, by applying drive voltages to the pixels 26, an image is displayed on the liquid crystal panel 12*a*. When image data for one screen is inputted to the timing controller 22, the timing controller 22 generates a clock signal, a horizontal synchronization signal, and a vertical synchronization signal. Then, the timing controller 22 outputs the image data, the clock signal, and the horizontal synchronization signal to the source circuit 20, and outputs the clock signal and the vertical synchronization signal to the gate circuit 21.

The source circuit 20 receives a gray-scale voltage from the internal power supply circuit 23, generates an analog drive voltage from the gray-scale voltage and the image data, and sequentially applies drive voltages to the signal lines S1 to SM in synchronization with the horizontal synchronization signal. The gate circuit 21 receives two kinds of scanning line drive signals from the internal power supply circuit 23, and applies the scanning line drive signals to the scanning line Gn24.

In the field-effect transistor 27 corresponding to the pixel 26 on the liquid crystal panel 12*a*, by applying two kinds of scanning line drive signals to the gate electrode 27*a* connected to the scanning line Gn24, a drive voltage on the signal line Sm25 connected to the source electrode 27*b* is applied to the drain electrode 27*c*.

Assume that a pixel identified by the scanning line Gn24 and the signal line Sm25 is a pixel (Gn, Sm). Assume that the gate circuit 21 receives a first scanning line drive signal from the internal power supply circuit 23 and applies a scanning line drive voltage to a scanning line G1. In the field-effect transistor 27 connected to the scanning line G1, by applying the first scanning line drive signal to the gate electrode 27*a*, a drive voltage applied to the source electrode 27*b* is applied to the drain electrode 27*c*. Thereby, the field-effect transistors 27 connected to the scanning line G1 to which the timing signal is applied and connected to the signal lines S1 to SM apply drive voltages to the pixel electrodes 28 of pixels (G1, S1-SM). At this time, the internal power supply circuit 23 outputs a second scanning line drive signal. In response thereto, the gate circuit 21 stops the output of the scanning line drive voltage.

Then, the gate circuit 21 applies a scanning line drive voltage to a scanning line G2, so that drive voltages are applied to pixels 26 (G2, S1-SM). The gate circuit 21 further applies scanning line drive signals sequentially to scanning lines G3 to GN in synchronization with the vertical synchronization signal outputted from the internal power supply circuit 23, for all the pixels on the liquid crystal panel 12*a*.

When the liquid crystal panel 12*a* displays video by applying drive voltages to the liquid crystal material packed in each pixel 26 and thereby changing light transmission, a common voltage needs to be inputted from the outside to determine each drive voltage applied to each pixel 26. For this reason, the internal power supply circuit 23 generates a DC voltage of 3.3 volts as a common voltage. The internal power supply circuit 23 generates a gray-scale generating voltage used as a threshold for determining an analog potential when the source circuit 20 generates a drive voltage in the above manner, and it is well known that the source circuit 20 can generate a voltage with little fluctuation.

In the liquid crystal module 12 having the above structure, electric charges corresponding to the voltage between the pixel electrode 28 connected to the drain electrode 27*c* of the field-effect transistor 27 and the counter electrode 29 to which a common voltage is applied from the internal power supply circuit 23 are charged in the pixel 26 on the liquid crystal panel 12*a*. Accordingly, when a pixel electrode voltage retained by the charge stored in each pixel 26 exceeds a predetermined threshold, an image can be displayed. When the pixel electrode voltage exceeds the predetermined threshold, the transmittance of the pixel changes in accordance with the voltage level, thereby enabling gradation expression. That is, with the above structure, the panel drive circuit 12*b* converts image data outputted from the video circuit 11 into analog signals having specified voltages and applies them to the pixels arranged in a matrix form on the liquid crystal panel 12*a* to change the molecular arrangement of liquid crystal material packed in the pixels, so that the display apparatus 10 displays an image on the liquid crystal module 12 based on the image data composed of RGB signals.

Figure 3:
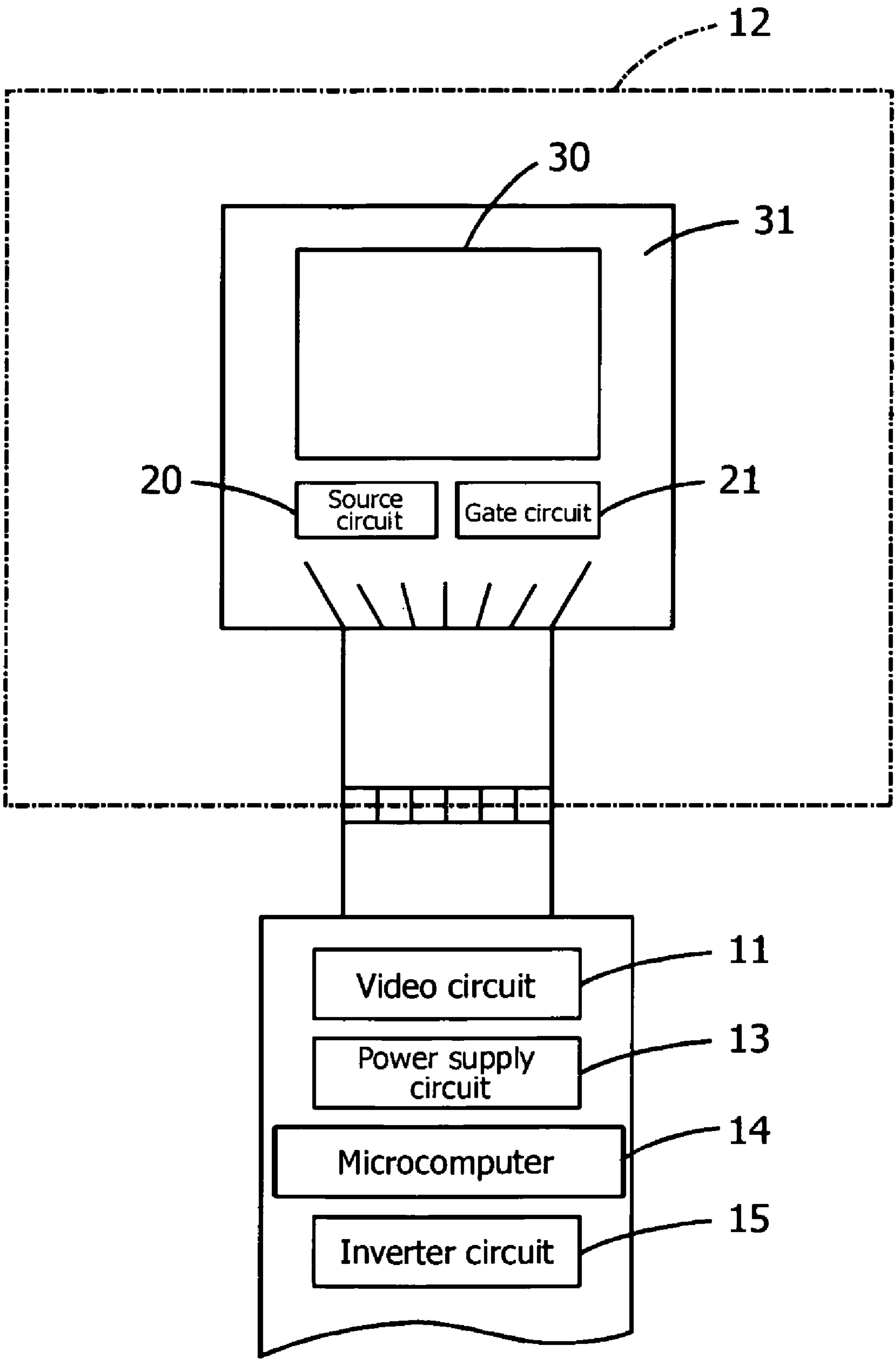
FIG. 3 is an example of schematic view showing a state in which circuits in the display apparatus are mounted.
Figure 4:
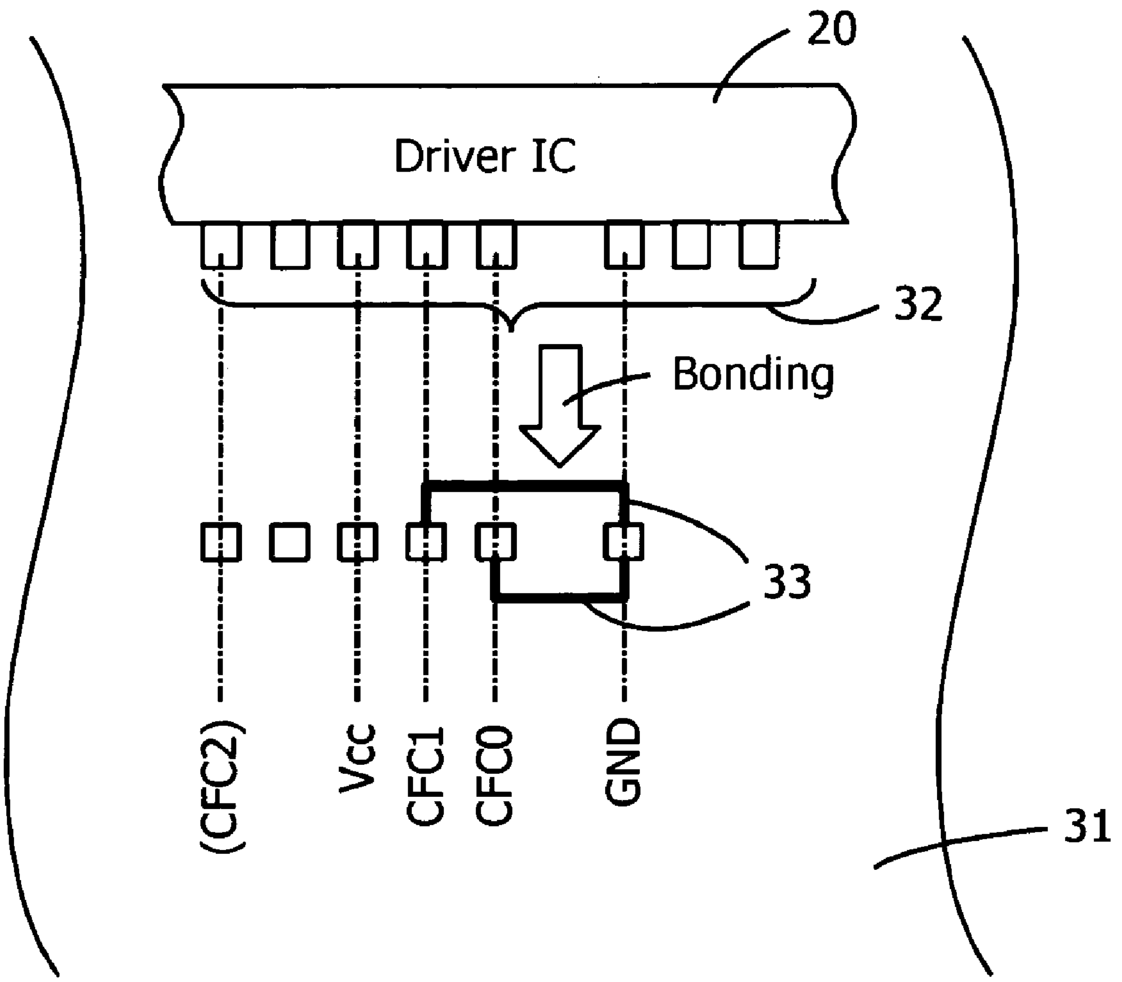
FIG. 4 is an example of schematic view showing a source circuit and showing a state in which the source circuit is mounted on a glass substrate on which wiring is formed.

3. Dealing with a Color Filter Having a Different RGB Arrangement in the Delta Arrangement Scheme Referring to FIGS. 3 and 4, a detailed description will be made of dealing with a color filter having a different RGB arrangement in the delta arrangement scheme. FIG. 3 is a schematic view showing a state in which the circuits in the display apparatus 10 are mounted. FIG. 4 is a schematic view showing the source circuit 20 and showing a state in which the source circuit 20 is mounted on the glass substrate 31 on which wiring 33 is formed.

In FIG. 3, at least one board on which the video circuit 11, the power supply circuit 13, the microcomputer 14, and the inverter circuit 15 are mounted is connected through a flat cable and a connector to the liquid crystal module 12. In the liquid crystal module 12, the source circuit 20, the gate circuit 21, and the like are mounted on the glass substrate 31 constituting the liquid crystal panel 12*a* having the color filter 30.

The source circuit 20 is, for example, a driver IC 20. The driver IC 20 can interchange drive voltages applied to the signal lines Sm25 in accordance with an arrangement of the color filter 30 by changing of setting of voltage to be supplied to the driver IC 20. As shown in FIG. 4, the driver IC 20 is a one-chip IC having wiring terminals 32 and is electrically connected and integrally fixed to the glass substrate 31 by bonding the wiring terminals 32 on the glass substrate 31.

The driver IC 20 is provided with two signal terminals for outputting mutually different voltages of a high and a low and two set terminals for setting an interchange of drive voltages applied to the signal lines Sm25, as wiring terminals 32. For example, the two signal terminals are a signal terminal Vcc for outputting a DC voltage of 3.3 volts as a high voltage and a signal terminal GND which is grounded as a low voltage. The two set terminals are set terminals CFC0 and CFC1.

The wiring 33 for connecting the signal terminals Vcc and GND to the set terminals CFC0 and CFC1 is formed on the glass substrate 31. The voltage to be supplied to the source circuit 20 is changed by changing a combination of connections thereof by the wiring 33 formed on the glass substrate 31. Usually, wiring on the glass substrate 31 varies according to the driver IC 20, which originally requires design suitable for the driver IC 20. Accordingly, the wiring 33 is designed at the beginning, and formed simultaneously when usual wiring is formed on the glass substrate 31.

Figure 5:
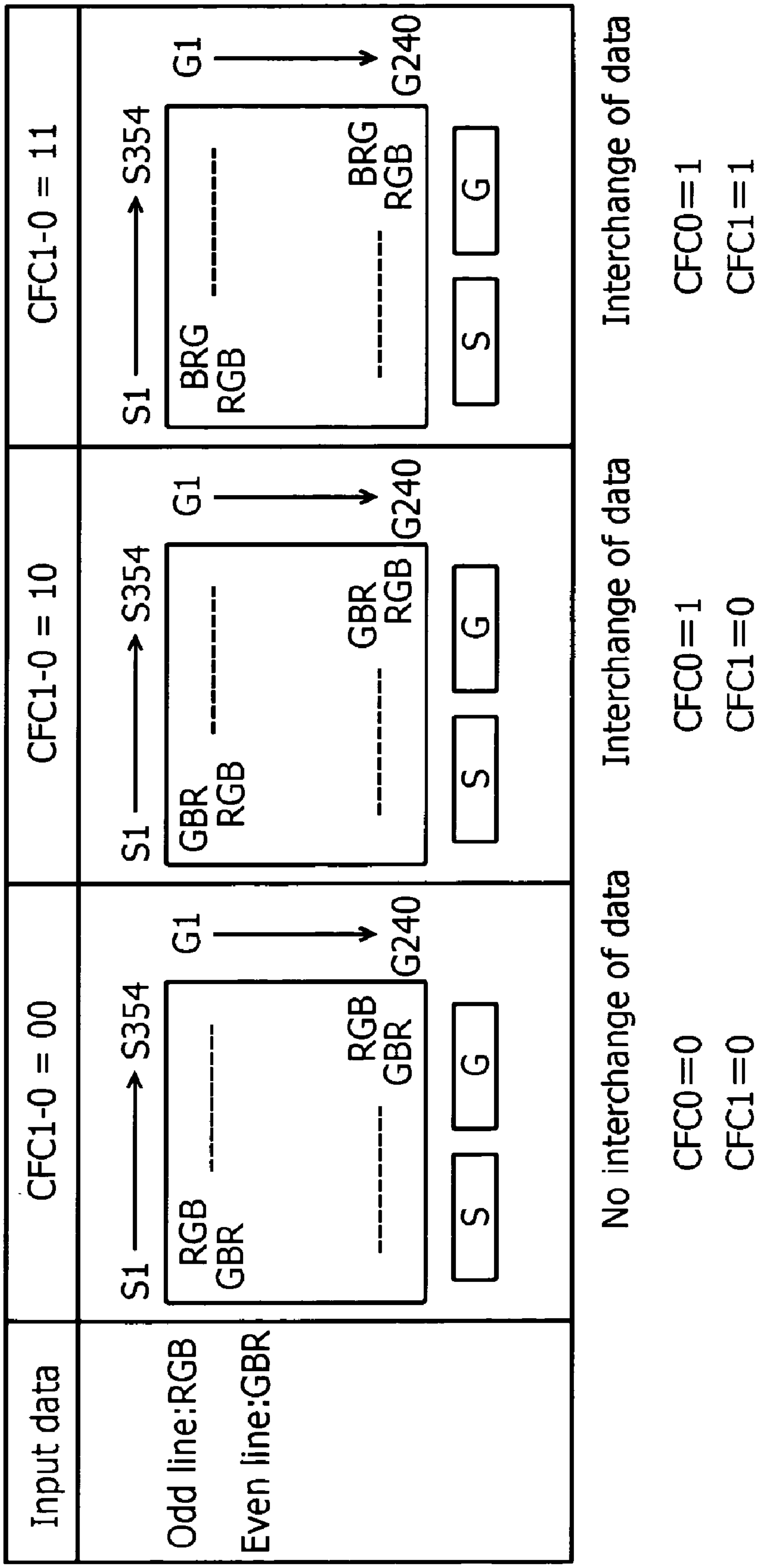
FIG. 5 is an illustration showing a plurality of color filters having different arrangements and showing an example of dealing with different arrangements of a color filter in the case where image data from a video circuit makes the arrangement of "odd lines: RGB, even lines: GBR".

FIG. 5 is an illustration showing a plurality of color filters 30 having different arrangements which are relatively often used and showing an example of dealing with different arrangements of the color filter 30 in the case where image data composed of RGB signals inputted from the video circuit 11 to the panel drive circuit 12*b* (hereinafter referred to as input data) makes the arrangement of "odd lines: RGB, even lines: GBR".

In FIG. 5, by setting both the set terminals CFC0 and CFC1 to "0 (low)", the driver IC 20 does not interchange drive voltages applied to the signal lines Sm25 to output them. Further, by setting the set terminal CFC0 to "1 (high)" and the set terminal CFC1 to "0", the driver IC 20 interchanges and outputs drive voltages applied to the signal lines Sm25 so as to make the arrangement of "odd lines: GBR, even lines: RGB" corresponding to the input data of"odd lines: RGB, even lines: GBR". Furthermore, by setting both the set terminals CFC0 and CFC1 to "1", the driver IC 20 interchanges and outputs drive voltages applied to the signal lines Sm25 so as to make the arrangement of "odd lines: BRG, even lines: RGB" corresponding to the input data of"odd lines: RGB, even lines: GBR".

If the color filter 30 has the arrangement of "odd lines: RGB, even lines: GBR"; by forming the wiring 33 on the glass substrate 31 so as to connect both the set terminals CFC0 and CFC1 to the signal terminal GND (low) and thus to set both the set terminals CFC0 and CFC1 to "0", the driver IC 20 does not interchange drive voltages to output them. Alternatively, if the color filter 30 has the arrangement of "odd lines: GBR, even lines: RGB"; by forming the wiring 33 on the glass substrate 31 so as to connect the set terminal CFC0 to the signal terminal Vcc (high) and the set terminal CFC1 to the signal terminal GND and thus to set the set terminal CFC0 to "1" and the set terminal CFC1 to "0", the driver IC 20 interchanges and outputs drive voltages so as to make the arrangement of the color filter 30 corresponding to the input data. Alternatively, if the color filter 30 has the arrangement of "odd lines: BRG, even lines: RGB"; by forming the wiring 33 on the glass substrate 31 so as to connect both the set terminals CFC0 and CFC1 to the signal terminal Vcc and thus to set both the set terminals CFC0 and CFC1 to "1", the driver IC 20 interchanges and outputs drive voltages so as to make the arrangement of the color filter 30 corresponding to the input data.

Further, in the case where the driver IC 20 is provided with the two signal terminals Vcc and GND and the two set terminals CFC0 and CFC1 as described above; by forming the wiring 33 on the glass substrate 31 so as to connect the set terminal CFC0 to the signal terminal Vcc and the set terminal CFC1 to the signal terminal GND and thus to set the set terminal CFC0 to "1" and the set terminal CFC1 to "0", it becomes possible to deal with four different arrangements of the color filter 30 corresponding to the same input data.

Figure 6:
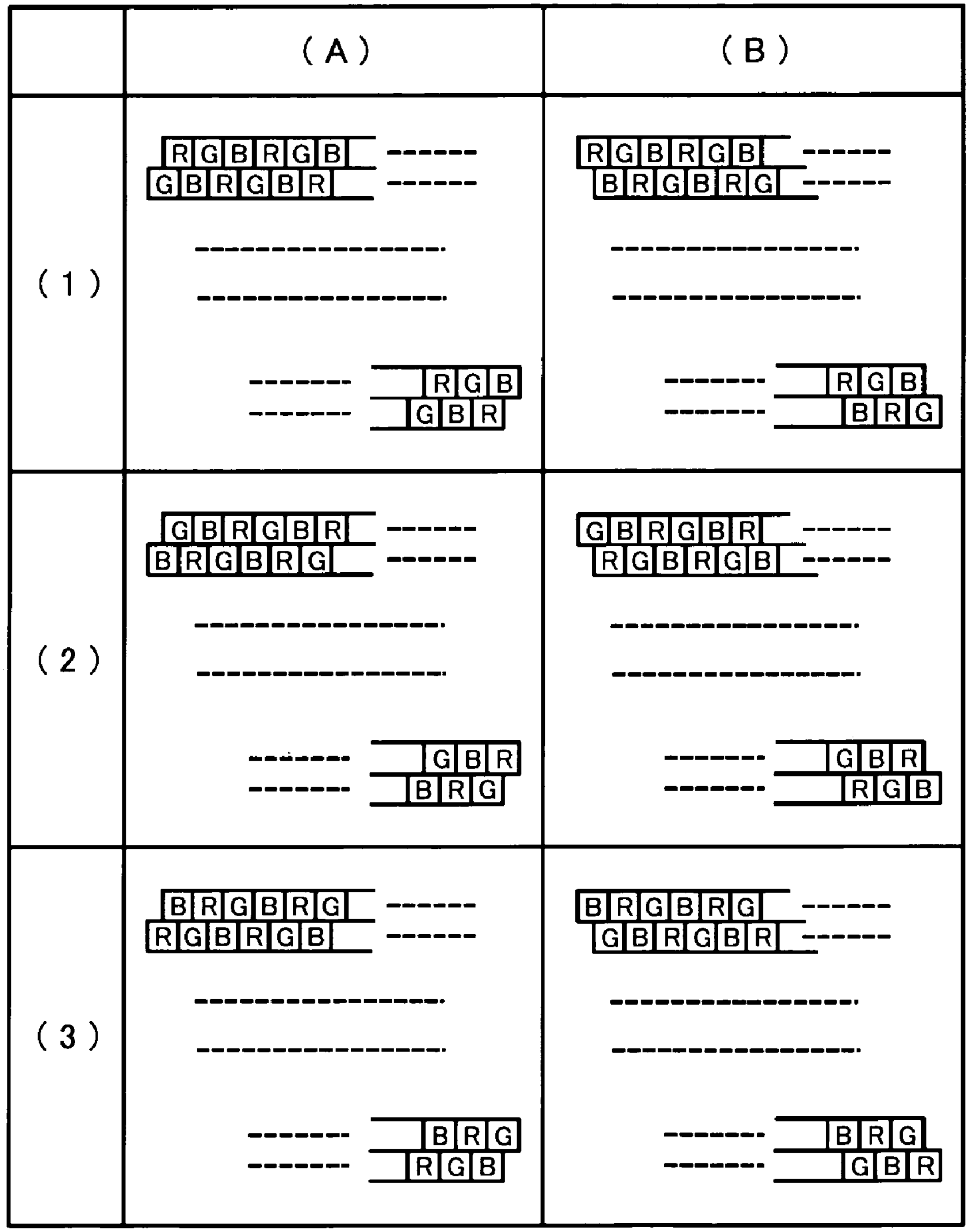
FIG.6 RELATED ART
FIG. 6 is an example of illustration showing six different RGB arrangements in a delta arrangement scheme.

Moreover, in the case where the driver IC 20 is further provided with a set terminal CFC2 and thereby has the two signal terminals Vcc and GND and the three set terminals CFC0, CFC1, and CFC2; by setting the three set terminals CFC0, CFC1, and CFC2 to "0" or "1" by a combination of the connections of the two signal terminals to the three set terminals, it is possible to deal with eight different arrangements of the color filter 30 corresponding to the same input data. Therefore, if the driver IC 20 is provided with at least two signal terminals and three set terminals, it is possible to deal with all six patterns of the color filter 30 in the delta arrangement shown in FIG. 6.

4. Conclusion

As described above, according to this embodiment, since a different arrangement of the color filter 30 can be used as it is without changing image data composed of RGB signals to be inputted to the source circuit 20, an input signal (input data) from the video circuit 11 can be used in common even if a different arrangement of the color filter 30 in the delta arrangement scheme is used in the liquid crystal panel 12*a*. Accordingly, the video circuit 11 for supplying input data and a circuit board having the video circuit 11 etc. mounted thereon can be used in common, which is advantageous to cost reduction including design and development time reduction. Further, when usual wiring suitable for the source circuit 20 is made on the glass substrate 31, the wiring 33 for the supply voltage setting on the source circuit 20 suitable for the color filter 30 can be made simultaneously, which is further advantageous to cost reduction including time reduction.

Further, according to this embodiment, since the setting of voltage to be supplied to the source circuit 20 can be changed by changing a combination of the connections of the two signal terminals Vcc and GND to the two set terminals CFC0 and CFC1 by the wiring 33 on the glass substrate 31, a different arrangement of the color filter 30 can be easily used as it is without changing image data (input data from the video circuit 11) composed of RGB signals to be inputted to the source circuit 20.

Further, according to this embodiment, since the substrate on which the source circuit is constructed is electrically connected and integrally fixed to the glass substrate 31 by bonding the wiring terminals 32 on the glass substrate 31, the source circuit 20 can easily interchange drive voltages applied to the signal lines Sm25 in accordance with an arrangement of the color filter 30.

Further, according to this embodiment, since it is possible to deal with six RGB arrangements of the color filter 30 in the delta arrangement scheme if the driver IC 20 is provided with at least two signal terminals and three set terminals, input data from the video circuit 11 can be used in common even if any of the different arrangements of the color filter 30 in the delta arrangement scheme is used in the liquid crystal panel 12*a*.

Further, according to this embodiment, since the driver IC 20 is bonded and integrally fixed on the glass substrate 31 and thereby the two signal terminals Vcc and GND are connected to the two set terminals CFC0 and CFC1 through the wiring 33 formed on the glass substrate 31; only by designing and forming the wiring 33 for the supply voltage setting on the driver IC 20 suitable for the color filter 30 simultaneously when usual wiring suitable for the driver IC 20 is designed and formed on the glass substrate 31, input data from the video circuit 11 can be used in common even if a different arrangement of the color filter 30 in the delta arrangement scheme is used in the liquid crystal panel 12*a*.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A liquid crystal module that displays an image based on image data composed of RGB signals, the liquid crystal module comprising:

a liquid crystal panel, having a color filter in which RGB colors are arranged in a delta arrangement, a plurality of signal lines that are arranged in a horizontal direction and extend in a vertical direction and a plurality of scanning lines that are arranged in the vertical direction and extend in the horizontal direction, and the signal linens and the scanning lines are disposed on a glass substrate and pixels at the intersection of each signal line and scanning line are arranged in a matrix form;

a source circuit for generating, based on the image data, drive voltages for a row of pixels arranged in the horizontal direction, which is a main scanning direction on the liquid crystal panel, and applying the drive voltages to the signal lines; and a gate circuit for sequentially enabling the scanning lines, subjecting the scanning lines to the drive voltages in the vertical direction that is a sub-scanning direction on the liquid crystal panel, the source circuit can interchange the drive voltages applied to the signal lines in accordance with an arrangement of the color filter by changing of setting of voltage to be supplied to the source circuit, and is electrically connected and integrally fixed to the glass substrate, the source circuit is constructed on a substrate having wiring terminals, the wiring terminals include at least, two signal terminals for outputting mutually different voltages of a high and a low and two set terminals for setting an interchange of the drive voltages, and the setting of voltage to be supplied to the source circuit is changed by changing a combination of connections of the signal terminals to the set terminals by wiring formed on the glass substrate.

2. The liquid crystal module according to claim 1, wherein the wiring terminals of the substrate on which the source circuit is constructed are bonded on the glass substrate on which the wiring is formed.

3. The liquid crystal module according to claim 1, wherein the wiring terminals include at least three set terminals, and it is possible to deal with six patterns of RGB arrangement of the color filter in the delta arrangement.

4. The liquid crystal module according to claim 2, wherein the source circuit is a driver IC having the wiring terminals, the two signal terminals are a terminal for outputting a DC voltage of 3.3 volts and a grounded terminal, and the driver IC is integrally fixed on the glass substrate by bonding the wiring terminals on the glass substrate.

* * * * *